United States Patent [19]

Richardson

[11] 4,239,738

[45] Dec. 16, 1980

[54] METHOD FOR PRODUCING BORON TRICHLORIDE

[75] Inventor: Kenneth W. Richardson, Canton, Ohio

[73] Assignee: PPG Industries, Inc., Pittsburgh, Pa.

[21] Appl. No.: 101,988

[22] Filed: Dec. 7, 1979

[51] Int. Cl.³ ............................................. C01B 35/06
[52] U.S. Cl. ................................................... 423/292
[58] Field of Search ......................................... 423/292

[56] References Cited

U.S. PATENT DOCUMENTS 2,943,916 7/1960 McElroy ............................... 423/292

Primary Examiner—G. O. Peters
Attorney, Agent, or Firm—Irwin M. Stein

[57] ABSTRACT

Boron trichloride is prepared by free radical liquid phase chlorination of borate ester, e.g., trimethylborate, at temperatures of between about 0° C. and 100° C., in the presence of an inert liquid organic solvent, e.g., carbon tetrachloride. The reaction temperature is controlled by condensing and returning to the reactor vaporized solvent removed from the reactor with the gaseous reaction products of the chlorination reaction, and by removing a portion of the liquid reaction medium from the reactor to an externally cooled heat extraction zone wherein the liquid reaction medium is cooled and returning the cooled liquid reaction medium to the reactor.

8 Claims, 1 Drawing Figure

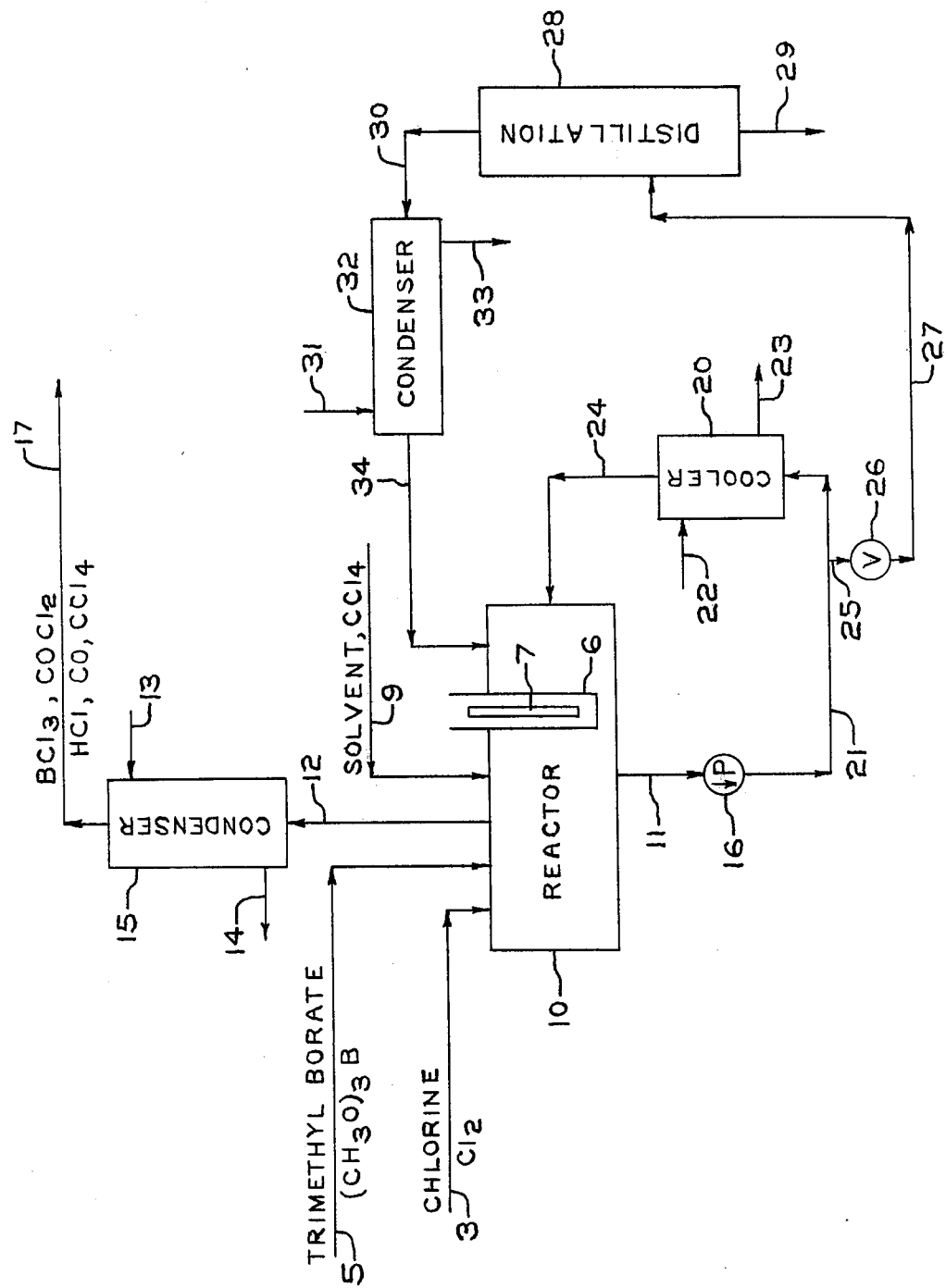

METHOD FOR PRODUCING BORON TRICHLORIDE

CROSS REFERENCE TO RELATED APPLICATIONS

This application is related to co-pending, co-assigned U.S. patent applications Ser. No. 23,858, filed Mar. 26, 1979 for N. R. De Lue et al for Preparation of Boron Trichloride and Ser. No. 43,292, filed May 29, 1979 for John C. Crano for Preparation of Boron Trichloride.

DESCRIPTION OF THE INVENTION

Boron trichloride is a compound that has many reported industrial uses. For example, its utility as an intermediate for the production of other boron containing compounds, such as diborane and refractory metal borides, e.g., titanium diboride, is established. It is also used as a refrigerant, as a catalyst and in Grignard reactions.

The preparation of boron trichloride by chlorination of trimethyl borate or trimethoxyboroxine at room temperature and autogeneous pressures has been described in U.S. Pat. No. 2,943,916. The balanced equation for the reaction of trimethyl borate with chlorine reported in column 1, line 39 of that patent is as follows:

$$B(OCH_3)_3 + 9Cl_2 \rightarrow BCl_3 + 3COCl_2 + 9HCl \qquad (1)$$

In accordance with equation (1), three moles of phosgene are produced for each mole of boron trichloride product.

A method for reducing the amount of phosgene produced as a result of borate ester chlorination is the subject of co-assigned U.S. patent application, Ser. No. 23,858, filed Mar. 26, 1979 for N. R. De Lue et al. In the aforesaid patent application, the chlorination of borate ester is conducted between about 20° C. and about 100° C., e.g., between 40° C. and 90° C., in the presence of an inert liquid organic solvent. When conducted at such temperatures and the gaseous products of the chlorination reaction are removed when formed, the chlorination reaction proceeds in a manner to form carbon monoxide as the principal carbon-containing product. This reaction can be represented by the following balanced equation:

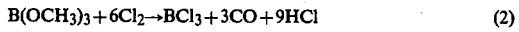

$$B(OCH_3)_3 + 6Cl_2 \rightarrow BCl_3 + 3CO + 9HCl \qquad (2)$$

As described in the aforesaid patent application of N. R. De Lue et al, temperatures above room temperature, e.g., 40° C. and above, improve the selectivity of the reaction toward the production of carbon monoxide. Thus, control of the reaction temperature can be a determining factor with regard to the composition of the carbon-containing product.

It has now been determined that the reaction temperature of the aforesaid chlorination reaction can be better controlled and maintained at the desired temperature by a combination of process steps, which include: condensing vaporized solvent removed from the reactor in a heat exchange zone and returning the condensed solvent to the liquid reaction medium, and removing a portion of the liquid reaction medium from the reactor to an externally cooled heat extraction zone wherein the liquid reaction medium is cooled and returning the cooled liquid reaction medium to the reactor.

BRIEF DESCRIPTION OF THE DRAWING

The present invention will be understood more readily by reference to the accompanying drawing, which is a diagrammatic illustration of the process for the chlorination of borate ester in an inert organic liquid solvent embodying the process steps of the present invention.

DETAILED DESCRIPTION

Referring now to the attached drawing, there is shown reactor 10 for conducting the chlorination reaction. Reactants borate ester, e.g., trimethyl borate, and chlorine are introduced into the reactor by means of feed lines 5 and 3 respectively. The chlorine reactant is preferably introduced below the level of the liquid in the reactor, e.g., by means of a sparger for distributing the chlorine gas within the reaction medium in small discrete bubbles, so as to provide agitation of and contact between the reactants. When introduced in this manner, the chlorine is absorbed readily in the reaction medium. Solvent, e.g., carbon tetrachloride, is introduced into reactor 10 through feed line 9. A source of light 7, e.g., ultraviolet light, within transparent container 6 is shown within reactor 10. A chemical free-radical initiator, the nature of which is discussed hereinafter, can be used in place of the light source.

In a typical start-up procedure, solvent is introduced into the reactor to establish a liquid body in which the reaction is conducted. After the solvent is brought to the desired temperature, borate ester free-radical initiator (light or chemical initiator) and chlorine are introduced into the reactor. If desired, the liquid body within the reactor can be heated (if such is required) by the heat generated by the reaction. In a continuous reaction, the reactants are metered continuously into the reactor. After an initial induction period, e.g., less than about 5 minutes, the chlorination reaction proceeds rapidly with substantial consumption of the chlorine reactant as it is added. The resulting mixture of solvent, borate ester, chlorinated derivatives of the borate ester and chlorine form a liquid reaction medium, which, at steady state conditions, reaches a state of equilibrium.

The gaseous products of the chlorination reaction, e.g., hydrogen chloride, carbon monoxide, phosgene and boron trichloride, are removed continuously from the reactor together with vaporized solvent, e.g., carbon tetrachloride, through flow line 12. The exothermic heat of reaction enhances removal of the gaseous products of the chlorination reaction and vaporization of the solvent. Gaseous product effluent from the reactor is forwarded to a heat exchange zone, e.g., reflux condenser 15, wherein solvent and partially chlorinated borate ester intermediates are condensed. The condensate is returned to reactor 10 where it can again be vaporized, thereby removing a portion of the heat of reaction, and partially chlorinated borate ester intermediates reacted further with chlorine. Reflux condenser 15 can be cooled by any convenient cooling means. Particularly useful as the coolant is water. The coolant inlet and outlets for reflux condenser 15 are shown in the drawing as flow lines 13 and 14 respectively. Product gaseous effluent from reflux condenser 15 is removed by flow line 17 for further processing and recovery of the boron trichloride product, as, for example, in the manner described in the aforesaid application of N. R. DeLue et al.

Although condensate from reflux condenser 15 is useful in moderating the temperature of the liquid reaction medium, it does not provide the flexibility desired for maintaining the reaction medium at a desired temperature. The amount of heat removed by vaporization of the solvent is a function of the amount of solvent vaporized, and the amount of vaporized solvent is a function of the reaction temperature and pressure. Further, large bubbles of solvent vapor within the reaction medium can obstruct the transmission of free radicals from light source 7 in transparent tube 6 when photoinitiation is used. Thus, the greater the heat required to be removed by vaporization of solvent, the greater the likelihood for obstruction of the light source by bubbles of solvent vapor. Moreover, the more heat removed from the reactor by vaporization of solvent, the larger the bubbles of solvent vapor tend to be, which reduces the opportunity for intimate contact between the reactants—a requirement for efficient production of boron trichloride. Finally, minimizing the amount of solvent reflux, minimizes the amount of chlorine contained in the gaseous product stream forwarded to reflux condenser 15.

In accordance with the present invention, boron trichloride is produced by conducting the liquid phase chlorination of borate ester with chlorine in a circulating body of liquid reaction medium utilizing the exothermic heat of reaction to vaporize a portion of the liquid reaction medium and controlling the rate of vaporization of the liquid reaction medium primarily by means of an external cooler through which hot liquid reaction medium is permitted to circulate. Referring again to the drawing, a portion of the liquid reaction medium is removed from reactor 10 through flow line 11 to pump 16 and thence through flow line 21 to a heat extraction zone, e.g., heat exchange means 20, wherein the liquid reaction medium is cooled. The cooled liquid reaction medium is recycled to reactor 10 through flow line 24.

Although liquid reaction medium is shown being removed from the bottom of reactor 10 through flow line 11, it can be removed from any suitable location in the reactor. For example, it can be removed from a point near the top of the liquid vapor interface and from the side of reaction vessel 10. Similarly, the cooled liquid reaction medium from flow line 24 can be introduced into the reactor in any suitable manner. Conveniently, the cooled liquid reaction medium is introduced near the bottom of the reactor, e.g., through sparging means, to assist in the intimate mixing of the reactants.

The amount of liquid reaction medium withdrawn from the reactor through flow line 11 can be controlled by valve means (not shown) in line 11. The volume of liquid reaction medium withdrawn per unit of time will vary broadly and depend on such variables as the temperature of the reaction, the reactions occuring (the heat of reaction differs for equation 1 and 2), the heat loss characteristics of the reactor, the degree to which the liquid reaction medium is cooled, etc. Generally sufficient volume of the liquid reaction medium is withdrawn and cooled to the degree required to maintain the reaction temperature substantially constant at the desired temperature. It is contemplated that between 5 and 40, e.g., 10 and 30, volume percent per minute of the reaction medium will be withdrawn and cooled to maintain the reaction temperature substantially constant.

While circulation of liquid reaction medium can be produced or enhanced by mechanical means, e.g., pump 16, it is contemplated that the circulation of liquid reaction medium from reactor 10 to the heat extraction zone, e.g., heat exchange means 20, and thence back to the reactor can be accomplished by a thermosyphon effect. In that embodiment, hot liquid reaction medium is withdrawn from near the top of the liquid-vapor interface within the reactor forwarded to the external heat extraction zone and the cooled liquid reaction medium introduced near the bottom of the reactor.

Control of the quantity of heat removed in the external heat extraction zone is had primarily by varying the temperature and/or the amount of coolant passing through that zone, e.g., heat exchange means 20. As in the case with condenser 15, any suitable coolant, e.g., water, can be used with heat exchanger 20. Coolant inlet and outlet to heat exchanger 20 are shown by flow lines 22 and 23 respectively. The quantity of heat removed from the reactor can also be controlled in part by valve means in line 11 which controls the amount of hot liquid reaction medium forwarded to the external heat extraction zone.

Although the external heat extraction zone is depicted by a single cooling means 20 on the drawing, it is contemplated that heat from the circulating liquid reaction medium can be removed in more than one cooling means, e.g., two heat exchangers in series. For example, it is contemplated that about one-half of the heat to be removed from the circulating liquid reaction medium will be removed in the first of two cooling means and the remainder removed in a second cooling means cooled with a refrigerant to provide flexibility in the system. By increasing or decreasing the circulation of refrigerant in the second cooling means, the amount of heat removed therein can be varied. The amount of refrigerant circulated can be controlled automatically by connecting automatic flow control means on the refrigerant inlet line to reactor temperature sensing means.

By controlling the amount of heat removed in the heat extraction zone, the reaction temperature can be regulated which, in turn, controls the rate of solvent vaporization in the reactor. The amount of heat removed in the heat extraction zone can be varied, as described above, to account for fluctuations that may occur in the reaction temperature. Further, the re-entering, cooled liquid reaction medium assists with the intimate mixing of borate ester and chlorine reactants, which is essential to the efficient production of boron trichloride.

As described in co-pending U.S. patent application Ser. No. 43,292, filed May 29, 1979 for John C. Crano, a purge fraction of the liquid reaction medium is distilled and the distillate recycled to the reactor to avoid the build-up of color bodies that form during the chlorination reaction. In accordance with that embodiment, a purge fraction of the circulating hot liquid reaction medium is removed by means of lines 25 and 27 to distillation column 28. The quantity of the purge fraction forwarded to the distillation column is controlled by valve means 26. Overhead from distillation column 28 is forwarded by line 30 to condenser 32 while the bottoms from column 28, which contain the color-forming bodies, are removed by means of flow line 29. Condenser 32 is cooled by any suitable coolant, e.g., water. The inlet and outlet flow lines for the coolant to condenser 32 are designated by lines 31 and 33 respectively. Condensed overhead from distillation column 28 is returned to reactor 10 by means of flow line 34. The cooled condensate returning to the reactor also assists in controlling the reaction temperature.

The volume of liquid reaction medium removed as purge will vary depending on the rate at which color bodies are formed in the reaction mixture. It is expected that the rate of color body formation will increase with temperature and therefore the volume of liquid reaction medium removed from the reactor as purge will depend, in part, on the chlorination temperature used. The volume of the reactor purge stream should be sufficient to maintain the reaction mixture substantially free of color-forming boron containing compounds.

As indicated, the purge fraction of liquid reaction mixture can vary broadly; but, typically will vary between about 4 and about 20 volume percent of the reaction mixture per hour, more commonly between about 6 and about 15, e.g., 8 and 12, volume percent of the reaction mixture per hour. The aforesaid purge fractions are calculated to provide a complete cycling of the reaction mixture volume in a time period ranging between about 5 and 24 hours, e.g., every 8 to 12 hours. The precise rate of purge will be adjusted by experience to that which will maintain the amount of undesirable color-forming bodies in the liquid reaction mixture at a satisfactory low level. A satisfactory low level may be defined as one which does not interfer with the chlorination reaction.

As the boron compound reactant, there can be used the borate esters; namely, trimethyl borate, trimethoxyboroxine and chloromethyl esters of boric acid. Examples of chloromethyl esters include dimethoxy boron chloride, i.e., $(CH_3O)_2BCl$, methoxy boron dichloride, i.e., $(CH_3O)BCl_2$, and chloromethyl esters represented by the following general formulae: $B(OCH_2Cl)(OCH_3)_2$, $B(OCH_2Cl)_2(OCH_3)$, $B(OCH_2Cl)_3$, $B(OCHCl_2)(OCH_3)_2$, $B(OCHCl_2)_2(OCH_3)$, $B(OCHCl_2)_3$, $(ClCH_2O)_2BCl$, $(Cl_2CHO)_2BCl$, $(ClCH_2O)BCl_2$, and $(Cl_2CHO)BCl_2$.

The term trimethoxyboroxine is intended to mean the product obtained from the reaction of boric oxide and trimethyl borate in varying ratios. These products can be represented for convenience by the formula $B_2O_3 \cdot (OCH_3)_3$. It is to be understood, however, that an excess of either boric oxide or trimethyl borate may be present, in which case the aforesaid formula may not represent the exact composition of the material.

Trimethyl borate is a commercially available material. It can be prepared by the reaction of boric oxide or boric anhydride with methanol. See, for example, Schlesinger et al, J. Am. Chem. Soc. 75, 213–215 (1953). See also, U.S. Pat. Nos. 2,217,354; 2,088,935; 2,808,424 and 2,813,115 all of which relate to the aforesaid process for manufacturing trimethyl borate.

The mole ratio of chlorine to borate ester reactant, e.g., trimethyl borate, can vary depending upon the nature of the reaction desired. For example, at a mole ratio of 9:1 or higher and at room temperature, the reaction will proceed in accordance with equation (1). If the mole ratio is lowered to about 6:1 and the gaseous products of chlorination removed during the chlorination reaction, the reaction will proceed in accordance with equation (2).

The mole ratio of chlorine to borate ester reactant will commonly vary from about 5.5:1 to about 9:1. Ratios greater than 9:1 can be used but are not economically desirable. Although equation (2) provides for a mole ratio of 6:1, the mole ratio of chlorine to borate ester can vary slightly from the theoretical stoichiometric value of 6:1. Typically, the mole ratio will be maintained over the period of the reaction at between about 5.5:1 and about 7.5:1, preferably between about 5.75:1 and about 6.75:1, when the reaction is conducted in accordance with equation (2). When the borate ester reactant used in chloromethyl ester of boric acid, the chlorine content of the ester is taken into account in calculating the mole ratio, i.e., in determining the total amount of chlorine that is introduced into the reactor.

The solvent utilized in the aforesaid chlorination reaction should be chemically inert to the reactants and reaction products and, preferably, will be one in which the reaction products are soluble. Most preferably, the reactants and reaction product, e.g., boron trichloride, will be soluble in the solvent. As the solvent, there can be mentioned carbon tetrachloride and chlorofluorinated oils such as Halocarbon oil, Fluorolube heat exchange fluids (polymers of trifluorovinyl chloride), and polychlorinated benzenes, such as 1,2,4-trichlorobenzene. Also contemplated are the analogous liquid polyhalogenated, e.g., chlorinated, fluorinated and/or brominated, aliphatic hydrocarbons of from one to four carbon atoms, such as 1,1,2-trichloro-1,2,2-trifluoroethane. Carbon tetrachloride is particularly useful as the solvent for the reason that is chemically inert to and is a solvent for the reactants and reaction products.

The particular solvent or the amount of solvent used is not critical. Only that amount needed to dissolve or disperse the reactants and reaction products and act as a heat sink for the heat of reaction is required, i.e., a solvating amount. Generally the weight ratio of solvent to borate ester will vary from about 1:1 to 10:1 at steady state conditions. At the beginning of the reaction, the weight ratio of solvent to borate ester can be as high as 100:1. The choice of solvent will depend in part on the temperature and pressure at which the chlorination reaction is conducted.

The temperature at which the chlorination reaction is conducted can vary, e.g., between about 0° C. and about 100° C. Typically, the reaction will be conducted between about 20° C. and about 100° C., more typically between about 40° C. and about 90° C. Preferably, reaction temperatures will range between about 50° C. and about 80° C., e.g., between about 60° C. and about 75° C. Temperatures above room temperature, e.g., 40° C. and above, improve the selectivity of the reaction toward the production of carbon monoxide. Thus, at said more favorable temperatures, the amount of phosgene formed is substantially less than the amount formed at room temperature, e.g., 23° C. At temperatures less than 20° C., significant amounts of phosgene are produced.

The temperature at which the chlorination reaction is conducted will also depend on the reactor pressure and the particular solvent used for the reaction medium. At atmospheric pressures, the maximum reaction temperature will be determined by the boiling point of the solvent. Temperatures above the boiling point of the solvent or, for example, in the upper portion of the aforesaid described temperature range, e.g., 70°–100° C. can be used when the chlorination reaction is conducted at pressures slightly above atmospheric. At superatmospheric pressures, temperatures in excess of 100° C., e.g., 125° C., can be used. Similarly, if reaction pressures less than atmospheric are used, the reaction temperature will be lowered accordingly.

The pressure at which the chlorination reaction described herein is conducted can also vary. For example, in the batch chlorination process described in U.S. Pat. No. 2,943,916, wherein the reaction according to equation (1) is conducted in a sealed tube, i.e., at autogenous pressures, it is estimated that the reactor pressure developed in the tube is greater than 10 and probably is in the neighborhood of 15 to 20 atmospheres. For continuous reactions, the pressure will commonly be less than about 3 atmospheres absolute pressure.

The chlorination reaction of the present process is more usually conducted at between about 0 and about 20 pounds per square inch gage, more typically between about 0 and 15 pounds per square inch gage (psig). The chlorination reaction is conducted conveniently at atmospheric or ambient pressures; however, when conducted continuously, pressures above atmospheric are used to overcome the pressure drop in equipment and piping downstream of the reactor. As indicated, reduced pressures, i.e., less than atmospheric, can also be used, e.g., pressures as low as 200 millimeters of mercury are contemplated.

When the herein described process is practiced in accordance with equation (2), the amount of phosgene coproduct produced is substantially reduced from that formed in accordance with equation (1), i.e., the amount of phosgene formed is less than 0.6 moles per mole of borate ester, e.g., trimethyl borate, reactant. The amount of phosgene thus formed can be reduced to less than 0.2, e.g., 0.1, mole of phosgene per mole of trimethyl borate and, at most preferred conditions, the amount of phosgene formed can be reduced to less than 0.03 mole, e.g., 0.01 mole, of phosgene per mole of trimethyl borate reactant. In contrast, the amount of phosgene formed in accordance with equation (1), is about 3 moles of phosgene per mole of trimethyl borate reactant.

Various benefits accrue by reducing the amount of phosgene formed in the reaction. Firstly, the amount of chlorine wasted in the formation of such coproduct is reduced accordingly. Unless such phosgene is recovered and treated, e.g., by cracking, to recover its chlorine content, the phosgene is destroyed, e.g., by neutralization with caustic. Both alternatives result in an economic burden on the process. The latter treatment results in a net loss of chlorine. Secondly, and perhaps more importantly, the less the amount of phosgene formed in the reaction, the less phosgene required to be separated from the boron trichloride product.

The boron compound, e.g., trimethyl borate, and chlorine reactants should be substantially dry for the reason that boron trichloride is readily hydrolyzed by water. Therefore, in order to prevent any unnecessary loss of boron trichloride product, the reactants, solvent, and the atmosphere in the reactor and recovery equipment should be substantially anhydrous, i.e., less than 10 ppm (parts per million) water.

The above described chlorination reaction is free-radical initiated and, therefore, any free-radical initiator that generates free radicals at the temperature of chlorination, e.g., light or organic peroxy compounds, can be used. The amount of initiator used is not critical so long as a threshold level of free radicals are provided to initiate and maintain the chlorination reaction. Such amount is typically referred to as an initiating amount.

Any source of light which will provide the necessary useful radiation, can be used. Such radiation is generally considered to be available from near ultraviolet or barely visible light. Thus, a common household tungsten filament light bulb, sun lamp, or mercury arc lamp can be used. The amount of radiation required is difficult to define; however, one skilled in the art can readily ascertain whether the quantum of useful radiation is adequate for the quantity of reactants used by observing the rate at which the chlorination reaction occurs. The light source for the photochlorination can be internal (inside the reactor) or external (outside the reactor). In the latter case, means must be provided for the radiation to enter the reactor, e.g., by use of a glass reactor or a glass sight port.

In addition to photoinitiation, the chlorination reaction can be initiated by an organic free-radical initiator, i.e., an organic, azo or peroxy compound. Examples of such compounds include diacyl peroxides, monoperoxycarbonates, dialkyl peroxydicarbonates, peroxyesters, and azo compounds. The particular free-radical initiator used is not critical provided that it is compatible with the reactants and solvent and generates free-radicals efficiently at the chlorination temperature selected. A person skilled in the art can readily select an appropriate initiator from published half-life data, which is a means of expressing the rate of decomposition of the initiator at a particular temperature. The organic free-radical initiators should be substantially free of water, i.e., substantially anhydrous, and substantially free of materials such as solvents, oils, etc. that can be chlorinated. Typically the number of carbon atoms in each radical (alkyl, aryl or cycloalkyl) of the peroxide will vary from 2 to 12.

Examples of suitable organic free radical initiators include: diacyl peroxides such as acetyl peroxide, benzoyl peroxide, caprylyl peroxide, p-chlorobenzoyl peroxide, decanoyl peroxide, 2,4-dichlorobenzoyl peroxide, lauroyl peroxide and propionyl peroxide; peroxyesters such as t-butyl peroxyacetate, t-butyl peroxy (2-ethylhexanoate), t-butyl peroxyisobutyrate, and t-butyl peroxypivalate; dialkyl peroxydicarbonates such as diethyl, diisopropyl, di-n-propyl, di-n-butyl, di-sec-butyl, diisobutyl, di-t-butyl, dicapryl, di-2-ethylhexyl, dibenzyl, dicyclohexyl and di-4-t-butyl-cyclohexyl peroxydicarbonate; monoperoxycarbonates such as t-butylperoxy isopropyl carbonate, and azo compounds such as azo-bis-isobutyronitrile.

As in the case of light, only that amount of organic free-radical initiator that is required to initiate and maintain the chlorination reaction need be used, i.e., an initiating amount. That amount will vary depending on the free-radical initiator used, the temperature of chlorination and the quantity of reactants. Such an amount can be determined readily by one skilled in the art. It is contemplated that for a peroxydicarbonate, such as diisopropyl peroxydicarbonate, about one weight percent, basis the borate ester, e.g., trimethyl borate, will be used. The organic free-radical initiator will be introduced into the reactor continuously for a continuous chlorination, as distinguished from a batch chlorination, so as to maintain a continuous supply of free radicals in the reaction medium.

In a typical embodiment of the present invention, about 20 gallons of carbon tetrachloride is charged to a 30 gallon reactor equipped with a glass sight port. About 4 pounds per hour of trimethyl borate and about 16.4 pounds per hour of chlorine are introduced into the reactor to form a liquid reaction medium which is irradiated with a 400 watt ultraviolet light source through the sight port. The reaction is conducted at about 5 psig.

About 5 gallons per minute of the liquid reaction medium is withdrawn from the reactor and forwarded to a first heat exchanger which utilizes 85° F. (29.4° C.) water as the coolant. This first heat exchanger removes about one-half of the total quantity of heat removed from this liquid porous stream. The partially cooled liquid reaction medium process stream is forwarded to a second heat exchanger which utilizes a refrigerant as the cooling medium. Trichloroethylene at −15° F. (−26° C.) is a contemplated useful refrigerant. This second heat exchanger is operated in a manner such that the circulating liquid reaction medium is cooled further and to a degree that the reaction medium in the reactor is maintained at a substantially constant reaction temperature, e.g., about 60° C. (165.5° F.)

A purge in the amount of about 0.05 gallons per minute of the hot circulating liquid reaction medium removed from the reactor to the first heat exchanger is forwarded to a flash still. The vapors from this distillation are condensed in a condenser that utilizes water as the coolant and the condensate returned to the reactor.

A gaseous product effluent containing boron trichloride is removed from the reactor and forwarded to a water cooled reflux condenser. Sufficient heat is removed from the gaseous effluent stream so that the crude boron trichloride product forwarded to the recovery zone from the reflux condenser is at a temperature of about 50° F. (10° C.) and solvent and partially chlorinated borate ester are condensed and returned to the reactor.

The present invention provides a method of controlling the exothermic liquid phase chlorination reaction of borate ester to produce boron trichloride by circulating a portion of the liquid reaction medium through an external heat exchanger in combination with the removal of heat from the reaction medium by the continuous vaporization of a further portion of said reaction medium to thereby maintain the temperature of the reaction medium at the desired temperature.

Although the present process has been described with reference to specific details of certain embodiments thereof, it is not intended that such details should be regarded as limitations upon the scope of the invention except as and to the extent that they are included in the accompanying claims.

I claim

1. In the process of producing boron trichloride by chlorination of borate ester wherein chlorine and borate ester are introduced into a liquid inert organic solvent in a reactor, thereby establishing a liquid reaction medium, and gaseous products of the chlorination reaction and vaporized solvent are removed from the reactor, the improvement which comprises, in combination, the steps of
    (a) condensing vaporized solvent removed from the reactor in a heat exchange zone and returning the condensed solvent to the liquid reaction medium;
    (b) removing a portion of the liquid reaction medium from the reactor and forwarding liquid reaction medium thus removed to an externally cooled heat extraction zone wherein the liquid reaction medium is cooled; and
    (c) returning cooled liquid reaction medium to the reactor, thereby controlling the temperature of the liquid reaction medium within the reactor.

2. The process of claim 1 wherein the liquid reaction medium is circulated through the externally cooled heat extraction zone with the assistance of mechanical means.

3. The process of claim 2 wherein the mechanical means is pumping means.

4. The process of claim 1 wherein the temperature of the reaction medium is maintained at between 20° C. and 100° C.

5. The process of claim 1 wherein the inert organic solvent is carbon tetrachloride.

6. The process of claim 1 wherein the cooled liquid reaction medium is introduced at below the liquid level of the reaction medium in the reactor.

7. The process of claim 4 wherein the externally cooled heat extraction zone comprises two heat exchangers in series.

8. The process of claim 7 wherein the flow of coolant to the second of the two heat exchangers is controlled by temperature sensing means for the liquid reaction medium within the reactor.

* * * * *